United States Patent
Brueggemann et al.

(10) Patent No.: US 8,504,244 B2
(45) Date of Patent: Aug. 6, 2013

(54) METHOD FOR IMPROVING THE DRIVING STABILITY OF A VEHICLE

(75) Inventors: Rainer Brueggemann, Ludwigsburg (DE); Andreas Reize, Adelsheim (DE); Philipp Frueh, Clayton (AU)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 13/090,401

(22) Filed: Apr. 20, 2011

(65) Prior Publication Data

US 2011/0264328 A1    Oct. 27, 2011

(30) Foreign Application Priority Data

Apr. 22, 2010   (DE) .......................... 10 2010 028 109

(51) Int. Cl.
*A01B 69/00*     (2006.01)
(52) U.S. Cl.
USPC ........................................................... 701/41

(58) Field of Classification Search
USPC ....................................................... 701/41, 70
See application file for complete search history.

(56) References Cited

U.S. PATENT DOCUMENTS

| | | | |
|---|---|---|---|
| 5,661,650 A | 8/1997 | Sekine et al. | |
| 2007/0078581 A1* | 4/2007 | Nenninger et al. | 701/70 |
| 2009/0271071 A1* | 10/2009 | Buerkel et al. | 701/41 |
| 2010/0082195 A1* | 4/2010 | Lee et al. | 701/25 |

FOREIGN PATENT DOCUMENTS

DE    19506364    8/1995

* cited by examiner

*Primary Examiner* — James Trammel
*Assistant Examiner* — Michael D Lang
(74) *Attorney, Agent, or Firm* — Kenyon & Kenyon LLP

(57) ABSTRACT

A method for improving the driving stability of a vehicle, including ascertaining a trajectory to be followed by the vehicle in a situation-specific manner, an active steering system and/or a braking device being set in the vehicle in such a way that at least one transverse dynamic state variable is within an associated limiting value.

9 Claims, 2 Drawing Sheets

METHOD FOR IMPROVING THE DRIVING STABILITY OF A VEHICLE

CROSS REFERENCE

The present application claims the benefit under 35 U.S.C. §119 of German Patent Application No. DE 102010028109.3, filed on Apr. 22, 2010, which expressly incorporated herein by reference in its entirety.

FIELD OF THE INVENTION

The present invention relates to a method for improving the driving stability of a vehicle.

BACKGROUND INFORMATION

German Patent Application No. DE 195 06 364 C2 describes a vehicle control system in which the instantaneous position of a vehicle and the trajectory to a destination is determined with the aid of a navigation device. The vehicle velocity and a steering system for controlling the steering angle are set in such a way that the vehicle is able to reliably negotiate a curve.

SUMMARY

An object of the present invention is to improve the driving stability of a vehicle via automatic interventions of an active steering system and/or a braking device.

The example method according to the present invention for improving the driving stability may be used in vehicles which are equipped in advance with an activatable braking device and with an active steering system, the braking device being automatically adjustable, via control signals, for example of a driver assistance system, and the active steering system being automatically adjustable in such a way that the vehicle follows a desired trajectory even without any intervention by the driver. The active steering system is, in particular, a steering system having a superimposed steering gear which allows an additional steering angle to be superimposed on the steering angle predefined by the driver. The superimposed steering angle may be set by activating an actuator in the superimposed steering gear.

The active steering system should basically also include adaptive servo steering mechanisms via which no additional steering angle may be generated, but the automatic application of a steering torque to the angles of the steerable wheels may be influenced.

The vehicle is also equipped with a sensor system for lane and/or obstacle detection so that a trajectory or an avoidance trajectory may be determined on the basis of the lane detection or obstacle detection. The sensor system is a surroundings sensor system, which is designed in particular as an optical system, in particular a video-based optical system; radar, lidar, ultrasound or other surroundings sensor systems may be considered here. The vehicle is advantageously also equipped with an additional sensor system for state variable detection, i.e., for ascertaining dynamic state variables in the longitudinal, transverse, and/or vertical directions on the position, speed, and/or acceleration plane. Both translational and rotational state variables may be considered. The sensor system is, for example, a component of an electronic stability program (ESP) and includes a transverse acceleration sensor, a yaw rate sensor, and rotary rate sensors in the vehicle wheels for ascertaining the wheel speeds. Ascertaining the vehicle speed is preferably also part of the sensor system.

In the example method according to the present invention for improving the driving stability it is provided that a trajectory is ascertained in a situation-specific manner on the basis of the lane and/or obstacle detection, whereupon the active steering system and/or the braking device are set in such a way that at least one transverse dynamic vehicle state variable does not exceed an associated limiting value. The transverse dynamic state variable is, for example, the vehicle transverse acceleration or the yaw rate. This procedure makes it possible either to negotiate a curve without an obstacle or to perform an avoidance maneuver around an obstacle with the highest possible driving stability. The obstacle may be another vehicle, which is to be driven around or passed, for which a simple or double lane change is necessary. Stationary or quasi-stationary obstacles, such as, for example, people, may also be considered.

Specifying the limiting value for the transverse dynamic vehicle state variable provides a criterion for the stability; there are two different intervention options for observing the limiting value: via the active steering system and the braking device. This makes it possible to determine a number of trajectories under observation of the limiting value, the vehicle being able to travel along any trajectory of the number of trajectories, taking into account the limiting value. For the concrete selection from the number of trajectories, another criterion may be formulated, which relates in particular to the ratio of operating the active steering to operating the braking device. Thus, for example, it may be advantageous to preferably activate the active steering and to operate the braking device only supplementarily, this procedure being based, for example, on a trajectory having a maximum possible radius. In this case, the forces and accelerations occurring in the transverse direction are below the allowable limiting values despite maintaining the vehicle speed, at least approximately. If the limiting values cannot be observed at the instantaneous vehicle speed, the braking device is additionally operated for reducing the speed.

An embodiment is basically possible in which the vehicle speed is initially reduced before automatic steering occurs.

In one advantageous embodiment, parametrization of the active steering system and/or the braking device is performed as a function of the position of the center of gravity. In this case, the height of the position of the center of gravity is determined in particular, preferably using an approximation function from the total mass of the vehicle, which may be determined from information of an acceleration sensor and the driving torque of the drive engine in the vehicle. The height of the center of gravity in the direction of the vehicle's vertical axis is preferably determined as a linear function of the vehicle mass, the height increasing with increasing vehicle mass.

Additionally or alternatively to the height of the center of gravity, the position of the center of gravity in the longitudinal direction of the vehicle may also be taken into account, which may be determined from the rotational speed differences between the front wheels and the rear wheels of the vehicle.

In particular, the height of the instantaneous center of gravity in the vehicle has a significant effect on the driving stability. The higher the position of the center of gravity, the greater is the risk of tipping over when negotiating curves, which is to be taken account in particular in the case of utility vehicles. By parametrizing the active steering system and/or the braking device, the increased risk of tipping over may be taken into account, for example by reducing the limiting values, in particular in view of the transverse dynamic driving state variables. Accordingly, for example, the vehicle speed is reduced more by operating the braking device, compared to low positions of the center of gravity.

Additionally or alternatively to influencing the parametrization of the active steering system and/or braking device, the position of the center of gravity may also be taken into account when selecting the trajectory. In this case, a trajectory having a suitable radius may be selected as a function of the vertical position of the center of gravity, trajectories having greater radii being advantageous for reducing the risk of tipping over as the height of the position of the center of gravity increases.

Furthermore, it is also possible to take into account a displacement of the center of gravity in the transverse direction, which may be determined, if necessary, from transverse dynamic state variables or from rotational speed differences between the left and right vehicle wheels.

The example method for improving the driving stability may be executed in a regulating or control unit in the vehicle, in which sensor data are used as input variables and, as described above, control signals are generated for activating the active steering system or the braking device. It may be advantageous to activate the braking device via a driver assistance system, for example via an electronic stability program (ESP). The regulating or control unit may be designed as a component of this driver assistance system or as a separate unit, which communicates with the driver assistance system.

BRIEF DESCRIPTION OF THE DRAWINGS

Further advantages and advantageous example embodiments are described below and are shown in the Figures.

DETAILED DESCRIPTION OF EXAMPLE EMBODIMENTS

Figure 1:
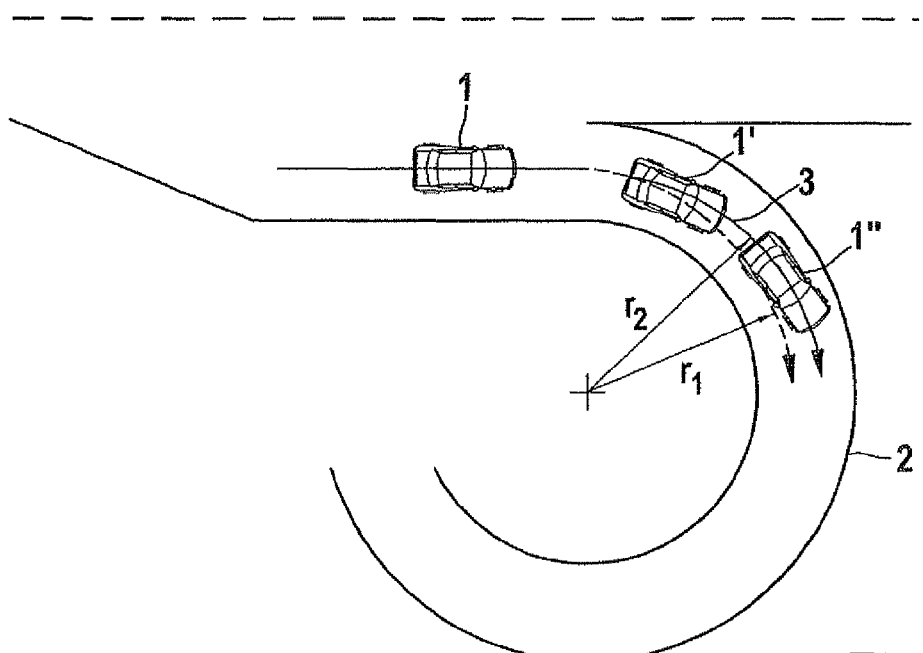
FIG. 1 shows a schematic diagram of a vehicle negotiating a curve on two different trajectories having different radii.

FIG. 1 shows a vehicle 1 when entering a curved roadway 2. Vehicle 1 is illustrated in different positions at the beginning and within the curve, the more advanced positions of the vehicle in the curve being identified as 1' and 1". Different trajectories 3 and 4 are marked in curved roadway 2, vehicle 1 following first trajectory 3 having the greater curve radius $r_2$, drawn using a solid line. On the other hand, second trajectory 4, which is drawn using a dashed line, has a smaller radius $r_1$. Both trajectories 3, 4, move within curved roadway 2. Due to the greater radius $r_2$ on trajectory 3, vehicle 1, which follows this trajectory 3, is subject to lower vehicle transverse accelerations.

Figure 2:
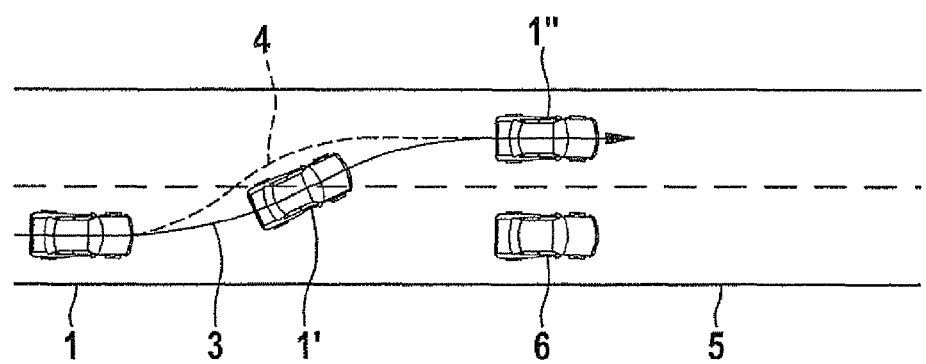
FIG. 2 shows a vehicle during a lane change maneuver.

FIG. 2 shows a driving situation on straight roadway 5. Vehicle 1 performs a lane change to drive around a preceding other vehicle 6. Similarly to the exemplary embodiment of FIG. 1, two trajectories 3 (solid line) and 4 (dashed line) are marked of which the vehicle follows the first trajectory 3, which differs from second trajectory 4 by greater radii and thus lower transverse accelerations and transverse forces. Both trajectories 3 and 4 represent a number of trajectories, each of which is located within the roadway and on which vehicle 1 may basically travel to drive around obstacle 6. The concrete selection of the trajectory may be made using other criteria, relating in particular to transverse dynamic vehicle state variables, which must be within associated limiting values.

Figure 3:
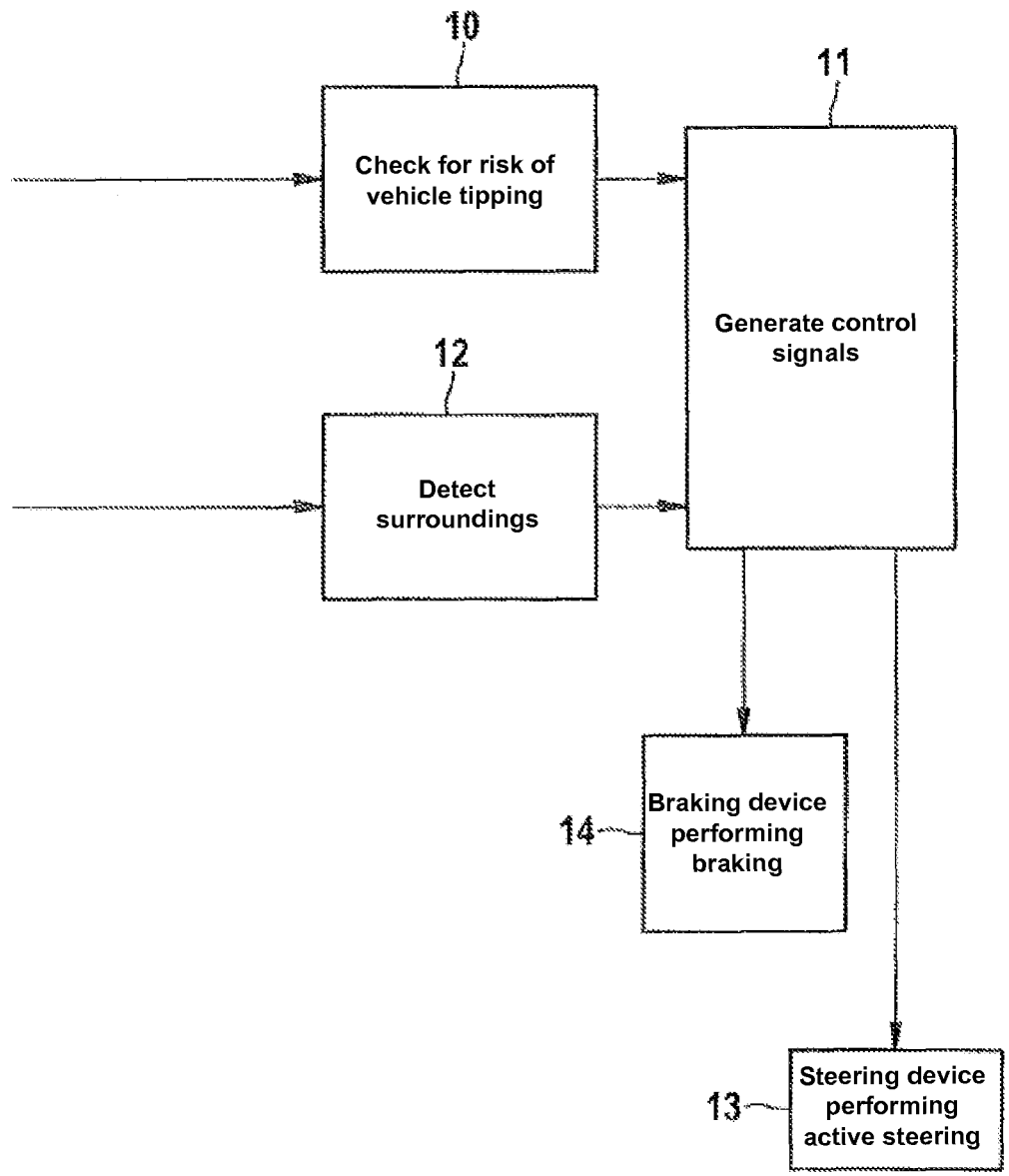
FIG. 3 shows a block diagram having different method steps for executing the example method for improving the driving stability.

FIG. 3 shows a block diagram having individual blocks 10 through 14, which symbolize different method steps for improving or preserving the driving stability of the vehicle. Blocks 10 through 14 and their respective method steps are executed in a regulating or control unit.

In a first block 10, a check is performed of whether a driving situation currently exists in which there is an increased risk of the vehicle tipping over. The check is performed as a function of signals of an electronic stability program (ESP), whose sensor system delivers measured values for transverse acceleration, steering angle, and yaw rate. The result of the ascertainment in block 10 is supplied as an input variable to a subsequent block 11 which additionally receives signals from a block 12 as an input variable, a surroundings detection being carried out in block 12 as a function of surroundings input signals. The surroundings input signals are input variables of a surroundings sensor system, which includes in particular a video camera for lane and/or obstacle detection. In addition, the surroundings sensor system may include a radar system, for example.

In block 11, control signals are generated from the input signals of blocks 10 and 12, and are supplied, on the one hand, to an active steering 13 and, on the other hand, to a braking device 14 or a unit which applies braking pressure to braking device 14. This unit may be a hydraulic pump of the ESP system, for example.

The calculations carried out in block 11 of the interventions which are necessary for moving the vehicle on a desired trajectory may be determined on the basis of various criteria or function. In particular, a transverse dynamic vehicle state variable is taken into account here, for example the transverse acceleration or the yaw rate, which should not exceed an associated limiting value. Furthermore, the position of the center of gravity is advantageously taken into account, in particular the vertical position and, if necessary, also its position in the longitudinal vehicle direction.

Active steering 13 and braking device 14 are activated in such a way that the above criteria are met. A hierarchy in activating the active steering and braking device may be additionally taken into account, for example, by activating the active steering preferentially and the braking device only supplementarily if this is feasible from the point of view of driving stability.

What is claimed is:

1. A method for improving the driving stability of a vehicle which is equipped with an active steering system, a braking device for setting braking torque, and a sensor system for at least one of lane and obstacle detection, the method comprising:
    ascertaining a trajectory in a situation-specific manner; and
    setting at least one of the active steering system and the braking device in such a way that at least one transverse dynamic vehicle state variable is within an associated limiting value;
    wherein a height of a position of a center of gravity of the vehicle is taken into account in the ascertaining of the trajectory.

2. The method as recited in claim 1 further comprising:
    performing a parametrization of the at least one of the active steering system and the braking device as a function of the position of the center of gravity of the vehicle.

3. The method as recited in claim 2, wherein the height of the position of the center of gravity of the vehicle is determined approximately from a total mass of the vehicle.

4. The method as recited in claim 3, wherein the total mass of the vehicle is determined from information of an acceleration sensor and a driving torque of a drive engine in the vehicle.

5. The method as recited in claim 4, wherein a position of the center of gravity in a longitudinal direction of the vehicle is determined from a rotational speed differences between front wheels and rear wheels of the vehicle.

6. The method as recited in claim 1, wherein a trajectory is selected which may be traveled under observation of the limiting value of the transverse dynamic vehicle state variable by operating the active steering system, the braking device being operated supplementarily to the active steering system.

7. A control unit for a vehicle, the vehicle being equipped with an active steering system, a braking device for setting braking torque, and a sensor system for at least one lane and obstructive detection, the control unit adapted to ascertain a trajectory in a situation-specific manner, and to set at least one of the active steering system and the braking device in such a way that at least one transverse dynamic vehicle state variable is within an associated limiting value, wherein a height of a position of a center of gravity of the vehicle is taken into account in determining the trajectory.

8. A vehicle comprising:
an active steering system;
a braking device;
a sensor system for at least one of lane and obstacle detection; and
a control unit adapted to ascertain a trajectory in a situation-specific manner, and to set at least one of the active steering system and the braking device in such a way that at least one transverse dynamic vehicle state variable is within an associated limiting valve, wherein a height of a position of a center of gravity of the vehicle is taken into account in the ascertainment of the trajectory.

9. The vehicle as recited in claim 8, wherein the braking device is activatable via an electronic stability program.

* * * * *